(12) United States Patent  
Zou

(10) Patent No.: US 12,412,344 B2  
(45) Date of Patent: Sep. 9, 2025

(54) IMAGE PROCESSING METHOD, MOBILE TERMINAL, AND STORAGE MEDIUM

(71) Applicant: Petal Cloud Technology Co., Ltd., Dongguan (CN)

(72) Inventor: Tao Zou, Dongguan (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 189 days.

(21) Appl. No.: 18/043,445

(22) PCT Filed: Aug. 3, 2021

(86) PCT No.: PCT/CN2021/110203  
§ 371 (c)(1),  
(2) Date: Feb. 28, 2023

(87) PCT Pub. No.: WO2022/048373  
PCT Pub. Date: Mar. 10, 2022

(65) Prior Publication Data  
US 2023/0334789 A1    Oct. 19, 2023

(30) Foreign Application Priority Data  
Sep. 1, 2020   (CN) .......................... 202010902601.7

(51) Int. Cl.  
*G06T 5/50* (2006.01)  
*G06T 19/00* (2011.01)  
*H04N 23/63* (2023.01)

(52) U.S. Cl.  
CPC .............. *G06T 19/006* (2013.01); *G06T 5/50* (2013.01); *H04N 23/632* (2023.01); *G06T 2207/20221* (2013.01)

(58) Field of Classification Search  
CPC ... G06T 19/006; G06T 2215/16; G06T 15/60; G06T 15/506; G06T 15/50; G06T 2215/12; G06F 3/011; G06F 3/04815; G09G 5/377  
See application file for complete search history.

(56) References Cited

U.S. PATENT DOCUMENTS 10,692,277 B1   6/2020   Sunkavalli et al.  
10,885,701 B1 * 1/2021   Patel ..................... A63F 13/57  
(Continued)

FOREIGN PATENT DOCUMENTS

CN    108509887 A    9/2018  
CN    108958475 A    12/2018  
(Continued)

*Primary Examiner* — Hau H Nguyen  
(74) *Attorney, Agent, or Firm* — Conley Rose, P.C.

(57) ABSTRACT

A method includes displaying a preview screen in response to a detected first operation; determining a first virtual object in response to a detected second operation; obtaining positioning information of the first virtual object, and displaying the first virtual object on the preview screen based on the positioning information; and synthesizing a first image and a second image based on the positioning information to obtain a third image. The first image includes a real environment picture. The second image includes a second virtual object corresponding to the positioning information. The second virtual object is generated by rendering the first virtual object based on ambient light information. The ambient light information corresponds to the real environment picture.

20 Claims, 9 Drawing Sheets

(56) References Cited

U.S. PATENT DOCUMENTS

2017/0168559 A1    6/2017   Jayadevaprakash et al.
2020/0074738 A1*   3/2020   Hare .................... G06T 7/70

FOREIGN PATENT DOCUMENTS

| CN | 108986232 A | 12/2018 |
| CN | 110365907 A | 10/2019 |
| CN | 112422945 A | 2/2021 |

* cited by examiner

IMAGE PROCESSING METHOD, MOBILE TERMINAL, AND STORAGE MEDIUM

CROSS-REFERENCE TO RELATED APPLICATIONS

This is a U.S. National Stage of International Patent Application No. PCT/CN2021/110203 filed on Aug. 3, 2021, which claims priority to Chinese Patent application No. 202010902601.7 filed on Sep. 1, 2020. Both of the aforementioned applications are hereby incorporated by reference in their entireties.

TECHNICAL FIELD

Embodiments of this application relate to the field of communication technologies, and in particular, to an image processing method, a mobile terminal, and a storage medium.

BACKGROUND

With continuous development of photographing technologies and widespread use of mobile terminals, a photographing function of a mobile terminal is increasingly favored by people. In addition, with rapid development of an augmented reality (Augmented Reality, AR) technology, virtual content (for example, a 3D model) can be loaded into a real scene. Based on this, an AR shooting application is developed, that is, the 3D model can be loaded into a real environment, and then the real environment (including a real character, animal, or object) and the 3D model are photographed.

SUMMARY

Embodiments of this application provide an image processing method, a mobile terminal, and a storage medium, to provide an image processing manner. In this manner, image shooting in a virtual-reality integration shooting mode can be completed, and it can be ensured that brightness and/or a shadow of a real environment are consistent with those of a virtual model. This avoids image distortion.

According to a first aspect, an embodiment of this application provides an image processing method, including:

A preview screen is displayed in response to a detected first operation. The preview screen includes a real environment picture. Specifically, the real environment picture is a current picture captured by a camera.

A first virtual object is determined in response to a detected second operation. Specifically, the second operation may include an operation of selecting a shooting mode by a user and an operation of selecting the first virtual object. For example, the user may select a virtual-reality integration shooting mode on the preview screen, to enter the virtual-reality integration shooting mode. In this case, in the virtual-reality integration shooting mode, the preview screen may display at least one candidate virtual object to be selected by the user, and the user may randomly select one of the candidate virtual object to determine the first virtual object.

Positioning information of the first virtual object is obtained, and the first virtual object is displayed on the preview screen based on the positioning information. Specifically, the positioning information may include size information and angle information of the first virtual object, and location information of the first virtual object on the preview screen. The positioning information may be default location information, default size information, and default angle information of the first virtual object, or may be location information, size information, and angle information of the first virtual object adjusted by the user. For example, the user may perform adjustment such as dragging, scaling, and rotation on the first virtual object.

A first image and a second image are synthesized based on the positioning information to obtain a third image. The first image includes the real environment picture. The second image includes a second virtual object corresponding to the positioning information. The second virtual object is generated by rendering the first virtual object based on ambient light information. The ambient light information corresponds to the real environment picture. Specifically, because the first image is a shot real environment picture, the first image includes only a real scene picture but does not include the second virtual object. Because the second image is a photographed second virtual object, the second image does not include a real environment picture. In other words, the first image and the second image are separated. The third image may be obtained by synthesizing (for example, superimposing) the first image and the second image. The third image may be a synthetic image for viewing by the user. In the third image, brightness and/or a shadow of the second virtual object are consistent with those of a real environment. This improves viewing experience of the user. The second virtual object may be obtained after rendering brightness and/or a shadow of the first virtual object, and the brightness and/or the shadow may be rendered based on the ambient light information.

In a possible implementation, that the first image and the second image are synthesized based on the positioning information to obtain a third image includes:

The first image is generated in response to a detected third operation. Specifically, the first image does not include the second virtual object.

Ambient light information corresponding to the first image is obtained based on the first image. Specifically, image recognition may be performed on the first image to obtain the ambient light information. The ambient light information may include an illumination angle and illumination intensity.

The first virtual object is rendered based on the ambient light information to obtain the second virtual object. Specifically, rendering may include brightness rendering and/or shadow rendering.

The second image is generated based on the second virtual object. Specifically, the second image does not include the real environment picture. The second image may be generated in a manner of blinking, screenshot, or the like. This is not limited in this embodiment of this application.

The first image and the second image are synthesized based on the positioning information to obtain the third image.

In a possible implementation, that the first image and the second image are synthesized based on the positioning information to obtain a third image includes:

Ambient light information corresponding to the real environment picture is obtained.

Specifically, image recognition may be performed on a current real environment picture captured by a camera, to obtain the corresponding ambient light information.

The first virtual object is rendered based on the ambient light information to obtain the second virtual object.

The first image and the second image are generated in response to a detected third operation.

The first image and the second image are synthesized based on the positioning information to obtain the third image.

In a possible implementation, that positioning information of the first virtual object is obtained includes:

The positioning information of the first virtual object on the preview screen is determined in response to a detected fourth operation.

Specifically, the positioning information may include the size information and angle information of the first virtual object, and coordinate location information of the first virtual object on the preview screen.

In a possible implementation, the positioning information includes default positioning information of the first virtual object.

In a possible implementation, that a first virtual object is determined in response to a detected second operation includes:

At least one candidate virtual object is displayed in response to the detected second operation.

The first virtual object is determined in the candidate virtual object in response to a detected fifth operation.

In a possible implementation, that at least one candidate virtual object is displayed in response to the detected second operation includes:

A type of a real environment on the preview screen is identified in response to the detected second operation, to obtain an environment type. Specifically, the environment type is used to identify a theme of a current real environment. For example, the environment type may include a character, an animal, a household appliance, a building, and the like.

The candidate virtual object is recommended to be displayed based on the environment type. Specifically, a virtual object database may be queried based on the environment type, so that the virtual object may be recommended to be displayed, to avoid multi-page display caused by excessive virtual objects. This improves a matching degree between the virtual object and the real environment, and improves user experience.

In a possible implementation, that the second virtual object is generated by rendering the first virtual object based on the ambient light information includes:

The first virtual object and the ambient light information are entered into a preset rendering model, so that the preset rendering model renders brightness and/or a shadow of the first virtual object, to obtain a second virtual object. The second virtual object includes the brightness and/or the shadow.

According to a second aspect, an embodiment of this application provides an image processing apparatus, including:
  a preview module, configured to display a preview screen in response to a detected first operation, where the preview screen includes a real environment picture;
  a selection module, configured to determine a first virtual object in response to a detected second operation;
  an obtaining module, configured to obtain positioning information of the first virtual object, and display the first virtual object on the preview screen based on the positioning information; and
  a synthesis module, configured to synthesize a first image and a second image based on the positioning information to obtain a third image, where the first image includes the real environment picture, the second image includes a second virtual object corresponding to the positioning information, the second virtual object is generated by rendering the first virtual object based on ambient light information, and the ambient light information corresponds to the real environment picture.

In a possible implementation, the synthesis module includes:
  a first generation unit, configured to generate the first image in response to a detected third operation;
  an identification unit, configured to obtain, based on the first image, ambient light information corresponding to the first image;
  a rendering unit, configured to render the first virtual object based on the ambient light information to obtain the second virtual object;
  a second generation unit, configured to generate the second image based on the second virtual object; and
  a synthesis unit, configured to synthesize the first image and the second image based on the positioning information to obtain the third image.

In a possible implementation, the synthesis module includes:
  an obtaining unit, configured to obtain ambient light information corresponding to the real environment picture;
  a rendering unit, configured to render the first virtual object based on the ambient light information to obtain the second virtual object;
  a generation unit, configured to generate the first image and the second image in response to a detected third operation; and
  a synthesis unit, configured to synthesize the first image and the second image based on the positioning information to obtain the third image.

In a possible implementation, the obtaining module is further configured to determine the positioning information of the first virtual object on the preview screen in response to a detected fourth operation.

In a possible implementation, the positioning information includes default positioning information of the first virtual object.

In a possible implementation, the selection module includes:
  a display unit, configured to display at least one candidate virtual object in response to the detected second operation; and
  a selection unit, configured to determine the first virtual object in the candidate virtual object in response to a detected fifth operation.

In a possible implementation, the display unit is further configured to: identify a type of a real environment on the preview screen in response to the detected second operation, to obtain an environment type, and recommend displaying the candidate virtual object based on the environment type.

In a possible implementation, the synthesis module is further configured to enter the first virtual object and the ambient light information into a preset rendering model, so that the preset rendering model renders brightness and/or a shadow of the first virtual object to obtain the second virtual object. The second virtual object includes the brightness and/or the shadow.

According to a third aspect, an embodiment of this application provides a mobile terminal, including:
  a memory, where the memory is configured to store computer program code, the computer program code includes instructions, and when the mobile terminal reads the instructions from the memory, the mobile terminal performs the following steps:

displaying a preview screen in response to a detected first operation, where the preview screen includes a real environment picture.

determining a first virtual object in response to a detected second operation;

obtaining positioning information of the first virtual object, and displaying the first virtual object on the preview screen based on the positioning information; and synthesizing a first image and a second image based on the positioning information to obtain a third image, where the first image includes the real environment picture, the second image includes a second virtual object corresponding to the positioning information, the second virtual object is generated by rendering the first virtual object based on ambient light information, and the ambient light information corresponds to the real environment picture.

In a possible implementation, when the instructions are executed by the mobile terminal, that the mobile terminal synthesizes the first image and the second image based on the positioning information to obtain the third image includes:

generating the first image in response to a detected third operation;

obtaining, based on the first image, ambient light information corresponding to the first image;

rendering the first virtual object based on the ambient light information to obtain the second virtual object;

generating the second image based on the second virtual object; and synthesizing the first image and the second image based on the positioning information to obtain the third image.

In a possible implementation, when the instructions are executed by the mobile terminal, that the mobile terminal synthesizes the first image and the second image based on the positioning information to obtain the third image includes:

obtaining ambient light information corresponding to the real environment picture;

rendering the first virtual object based on the ambient light information to obtain the second virtual object;

generating the first image and the second image in response to a detected third operation; and synthesizing the first image and the second image based on the positioning information to obtain the third image.

In a possible implementation, when the instructions are executed by the mobile terminal, that the mobile terminal obtains the positioning information of the first virtual object includes:

determining the positioning information of the first virtual object on the preview screen in response to a detected fourth operation.

In a possible implementation, the positioning information includes default positioning information of the first virtual object.

In a possible implementation, when the instructions are executed by the mobile terminal, that the mobile terminal determines the first virtual object in response to the detected second operation includes:

displaying at least one candidate virtual object in response to the detected second operation; and determining the first virtual object in the candidate virtual object in response to a detected fifth operation.

In a possible implementation, when the instructions are executed by the mobile terminal, that the mobile terminal displays the at least one candidate virtual object in response to the detected second operation includes:

identifying a type of a real environment on the preview screen in response to the detected second operation, to obtain an environment type; and recommending displaying the candidate virtual object based on the environment type.

In a possible implementation, when the instructions are executed by the mobile terminal, that the mobile terminal generates the second virtual object by rendering the first virtual object based on the ambient light information includes:

entering the first virtual object and the ambient light information into a preset rendering model, so that the preset rendering model renders brightness and/or a shadow of the first virtual object to obtain the second virtual object, where the second virtual object includes the brightness and/or the shadow.

According to a fourth aspect, an embodiment of this application provides a computer-readable storage medium. The computer-readable storage medium stores a computer program. When the computer program is run on a computer, the computer is enabled to perform the method according to the first aspect.

According to a fifth aspect, an embodiment of this application provides a computer program. When the computer program is executed by a computer, the computer program is used to perform the method according to the first aspect.

In a possible design, some or all of the programs in the fifth aspect may be stored in a storage medium encapsulated with a processor, or may be stored in a memory that is not encapsulated with the processor.

DESCRIPTION OF EMBODIMENTS

Figure 1:
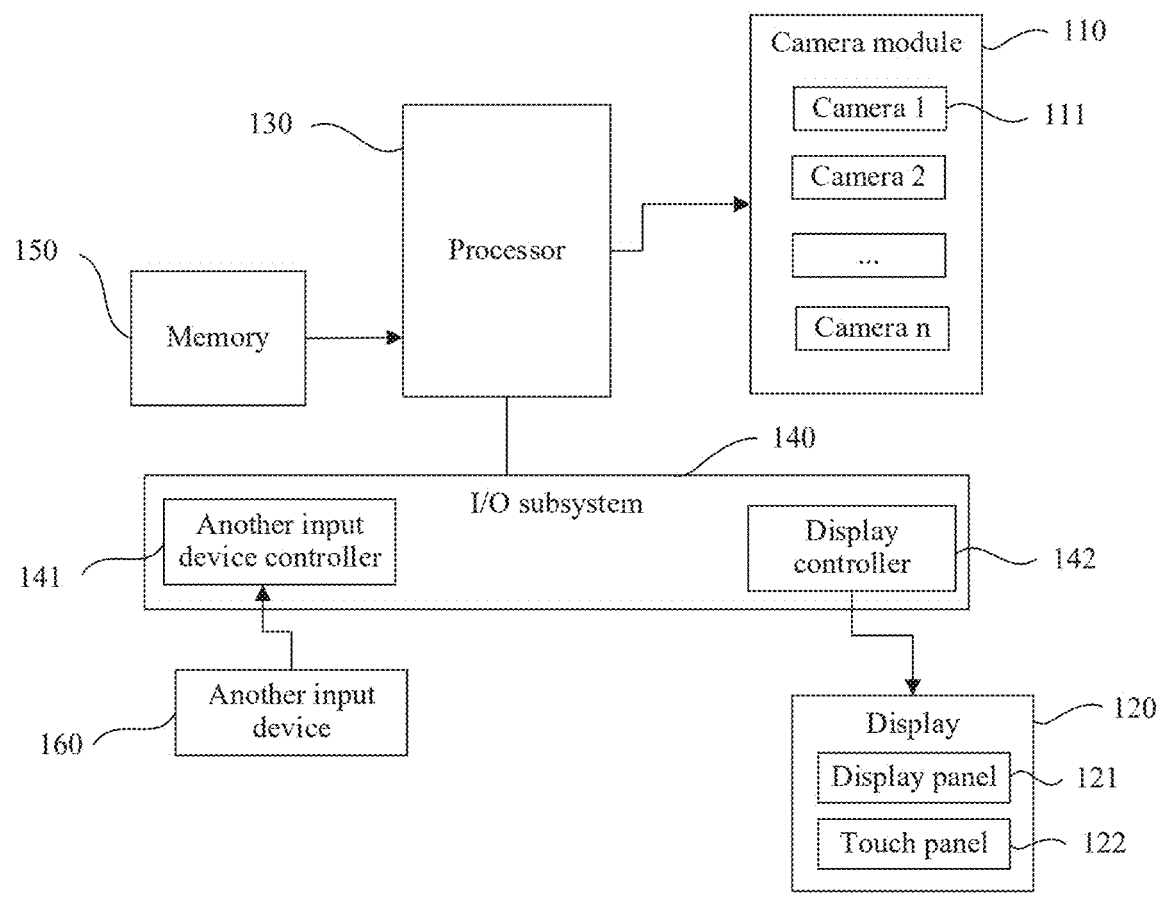
FIG. 1 is a schematic diagram of a structure of a mobile terminal according to an embodiment of this application.

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature restricted by "first" or "second" may explicitly or implicitly include one or more features. In the descriptions of embodiments of this application, unless otherwise specified, "a plurality of" means two or more than two.

An existing mobile terminal usually includes a camera, and a user may shoot an image randomly by using the camera. With development of an AR technology, people can combine a real scene with a virtual scene. As the AR technology is applied to camera shooting, the user can photograph a real object and a virtual object on one image.

Usually, the virtual object is a 3D model. However, for ease of invoking or loading by the user, the 3D model is generated in advance. In other words, each feature (for example, brightness) of the 3D model is preset. In addition, the 3D model is usually shadow-free. In an actual shooting process, a light source in a real environment is uncontrollable. For example, brightness of an object in a photo is different due to different angles of the light source. In addition, the object in the real environment usually generates a shadow part in the photo. In this case, if a shadow-free 3D model and a photo with a shadow are synthesized, because brightness and a shadow of the 3D model are inconsistent with those of the object displayed in the photo, a synthesized image is distorted.

Based on the foregoing problem, embodiments of this application provide an image processing method, which is applied to a mobile terminal, to ensure that brightness and/or a shadow of a real environment are consistent with those of a virtual model. This avoids image distortion. The mobile terminal may also be referred to as a terminal device, user equipment (User Equipment, UE), an access terminal, a subscriber unit, a subscriber station, a mobile station, a mobile console, a remote station, a remote terminal, a mobile device, a user terminal, a terminal, a wireless communication device, a user agent, or a user apparatus, a personal digital assistant (Personal Digital Assistant, PDA) device of the mobile terminal, a handheld device with a wireless communication function, a handheld communication device, a handheld computing device. A specific form of the mobile terminal that performs the technical solution is not specially limited in embodiments of this application.

FIG. 1 is a schematic diagram of a structure of a mobile terminal 100 according to an embodiment of this application. The mobile terminal 100 may include a camera module 110, a display 120, a processor 130, an I/O subsystem 140, a memory 150, and another input device 160. The camera module 110 is configured to collect an image, and the display 120 is configured to display the image and an operation interface.

The camera module 110 includes at least one camera 111. If the camera module 110 includes only one camera 111, the camera 111 may be front-facing or rear-facing. If the camera module 110 includes the plurality of cameras 111, the plurality of cameras 111 may be located on a same side of the mobile terminal 100, or may be randomly distributed on two sides of the mobile terminal 100. It should be noted that, if there are the plurality of cameras 111 on any side of the mobile terminal 100, there may be one primary camera on the side. When a user starts shooting, the mobile terminal 100 may enable the primary camera, and may obtain current environment information by using the primary camera. The current environment information is displayed on a preview screen of the mobile terminal 100. In this application, the camera 111 may be configured to obtain ambient light information, for example, an illumination angle and illumination intensity. The camera 111 may also be configured to capture a current picture of a real environment.

The display 120 may be configured to display information entered by the user or information provided for the user and various menus of the terminal device 100, and may further accept a user input. Specifically, the display 120 may include a display panel 121 and a touch panel 122. The display panel 121 may be configured in a form of a liquid crystal display (LCD, Liquid Crystal Display), an organic light-emitting diode (OLED, Organic Light-Emitting Diode), or the like. The touch panel 122, also referred to as a touchscreen, may collect a contact operation or a non-contact operation performed by the user on or near the touch panel (for example, an operation performed by the user on the touch panel 122 or near the touch panel 122 by using any suitable object or accessory such as a finger or a stylus, which may further include a body sense operation, where the operation includes operation types such as a single-point control operation and a multi-point control operation), and drive a corresponding connection apparatus based on a preset program. Optionally, the touch panel 122 may include two parts: a touch detection apparatus and a touch controller. The touch detection apparatus detects a touch orientation and posture of the user, detects a signal brought by a touch operation, and transfers the signal to the touch controller. The touch controller receives touch information from the touch detection apparatus, converts the touch information into information that can be processed by the processor, and then sends the information to the processor 130. The touch controller can also receive and execute a command sent by the processor 130. In addition, the touch panel 122 may be implemented by using a plurality of types such as a resistive type, a capacitive type, an infrared type, and a surface acoustic wave type, or the touch panel 122 may be implemented by using any technology developed in the future. Further, the touch panel 122 may cover the display panel 121. The user may perform, based on content displayed on the display panel 121 (the displayed content includes but is not limited to a soft keyboard, a virtual mouse, a virtual key, an icon, and the like), an operation on or near the touch panel 122 that covers the display panel 121. After detecting the operation on or near the touch panel 122, the touch panel 122 transmits the operation to the processor 130 by using the I/O subsystem 140, to determine a user input. Then the processor 130 provides a corresponding visual output on the display panel 121 based on the user input by using the I/O subsystem 140. Although the touch panel 122 and the display panel 121 in FIG. 1 are used as two independent components to implement input and output functions of the terminal device 100, in some embodiments, the touch panel 122 and the display panel 121 may be integrated to implement the input and output functions of the terminal device 100. In this application, the display 120 may be configured to receive an input operation of the user. For example, the user may perform operations such as tapping, sliding, and dragging on the display 120. The display 120 may further display a real environment picture captured by the camera 111.

The processor 130 is a control center of the mobile terminal 100, connects various parts of the entire terminal device by using various interfaces and lines, and performs various functions of and data processing on the mobile terminal 100 by running or executing a software program and/or a module stored in the memory 150 and invoking data stored in the memory 150, so as to perform overall monitoring on the mobile terminal 100. Optionally, the processor 130 may include one or more processing units. Preferably, an application processor and a modem processor may be integrated into the processor 130. The application processor mainly processes an operating system, a user interface, an application, and the like. The modem processor mainly processes wireless communication. It may be understood that the modem processor may not be integrated into the processor 130. The involved processor may include, for example, a central processing unit (Central Processing Unit, briefly referred to as a CPU below), a digital signal processor (Digital Signal Processor, briefly referred to as a DSP below), or a microcontroller, and may further include a graphics processing unit (Graphics Processing Unit, briefly referred to as a GPU below), an embedded neural-network processing unit (Neural-network Processing Unit, briefly referred to as an NPU below), and an image signal processor (Image Signal Processor, briefly referred to as an ISP below). The processor may further include a necessary hardware accelerator or logic processing hardware circuit, for example, an application-specific integrated circuit (Application-Specific Integrated Circuit, briefly referred to as an ASIC below), or one or more integrated circuits configured to control program execution in the technical solutions of this application. In this application, the processor 130 may be configured to synthesize an image in the real environment and a virtual object into one image.

The I/O subsystem 140 is configured to control an external input/output device, and may include another input device controller 141 and a display controller 142. Optionally, one or more another input control device controllers 141 receive a signal from the another input device 160 and/or send a signal to the another input device 160. The another input device 160 may include a physical button (a press button, a rocker button, or the like), a dial, a slider switch, a joystick, a click scroll wheel, and an optical mouse (the optical mouse is a touch-sensitive surface that does not display a visual output, or is an extension of a touch-sensitive surface that includes a touchscreen). It should be noted that the another input control device controller 141 may be connected to any one or more of the foregoing devices. The display controller 142 in the I/O subsystem 140 receives a signal from the display 120 and/or sends a signal to the display 120. After the display 120 detects the user input, the display controller 142 converts the detected user input into interaction with a user interface object displayed on the display 120, to implement human-machine interaction.

The memory 150 may be configured to store the software program and the module, and the processor 130 runs the software program and the module that are stored in the memory 150, to perform various function applications of and data processing on the mobile terminal 100. The memory 150 may include a program storage area and a data storage area. The program storage area may store an operating system, an application required by at least one function (for example, a sound playing function and an image playing function), and the like. The data storage area may store data (for example, audio data and an address book) and the like created based on use of the mobile terminal 100. In addition, the memory 150 may include a high-speed random access memory, and may further include a nonvolatile memory, for example, at least one magnetic disk storage device, a flash memory device, or another volatile solid-state storage device. In this application, the memory 150 may be configured to store a shot image and a photographed virtual object.

The another input device 160 may be configured to receive entered digital or character information, and generate a key signal input related to user settings and function control of the mobile terminal 100. Specifically, the another input device 160 may include but is not limited to one or more of a physical keyboard, a function button (for example, a volume control button or an on/off button), a trackball, a mouse, a joystick, an optical mouse (the optical mouse is a touch-sensitive surface that does not display a visual output, or is an extension of a touch-sensitive surface that includes a touchscreen), and the like. The another input device 160 is connected to the another input device controller 141 of the I/O subsystem 140, and performs signal interaction with the processor 130 under control of the another device input controller 141.

Figure 2:
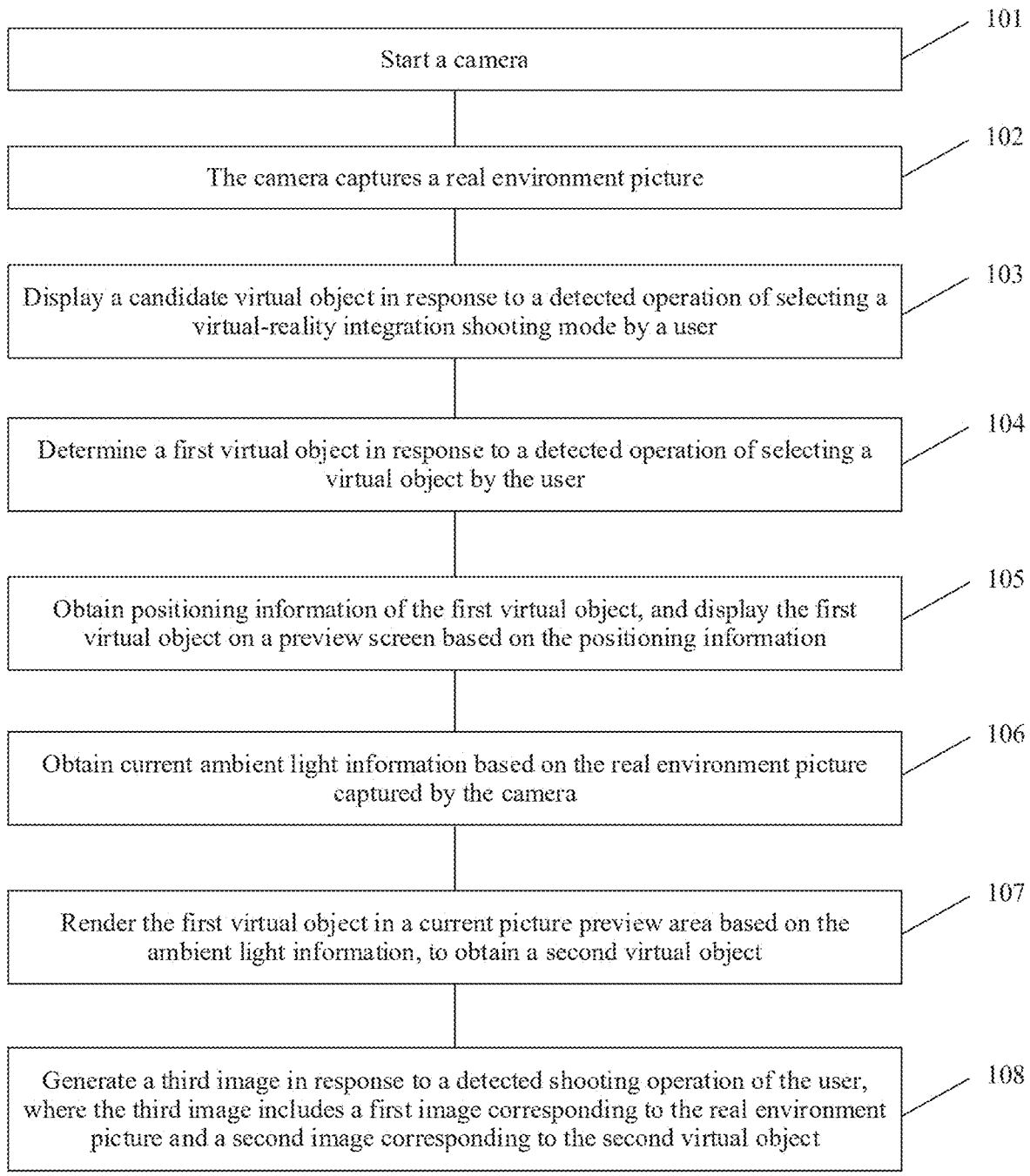
FIG. 2 is a flowchart of an image processing method according to an embodiment of this application.

With reference to FIG. 2 to FIG. 5, the image processing method provided in embodiments of this application is described herein. FIG. 2 is a flowchart of an embodiment of the image processing method according to this application. The method may be applied to the mobile terminal 100, and includes the following steps.

Step 101: Start a camera.

Specifically, the camera may be started by running an application corresponding to the camera. For example, a user may operate an icon of a camera application on a display interface of the mobile terminal 100, to start the camera. It may be understood that, when the user opens the camera application by operating the icon, the user may tap, double-tap, or slide, or may use another manner. This is not limited in this embodiment of this application.

Optionally, the camera may be started by invoking the camera application in an application. For example, when the user performs a conversation with another user by using a chat application, the user may invoke the camera application in the chat application, so that a photo may be shot in the chat application and then sent to the another user.

Step 102: The camera captures a real environment picture.

Figure 3A:
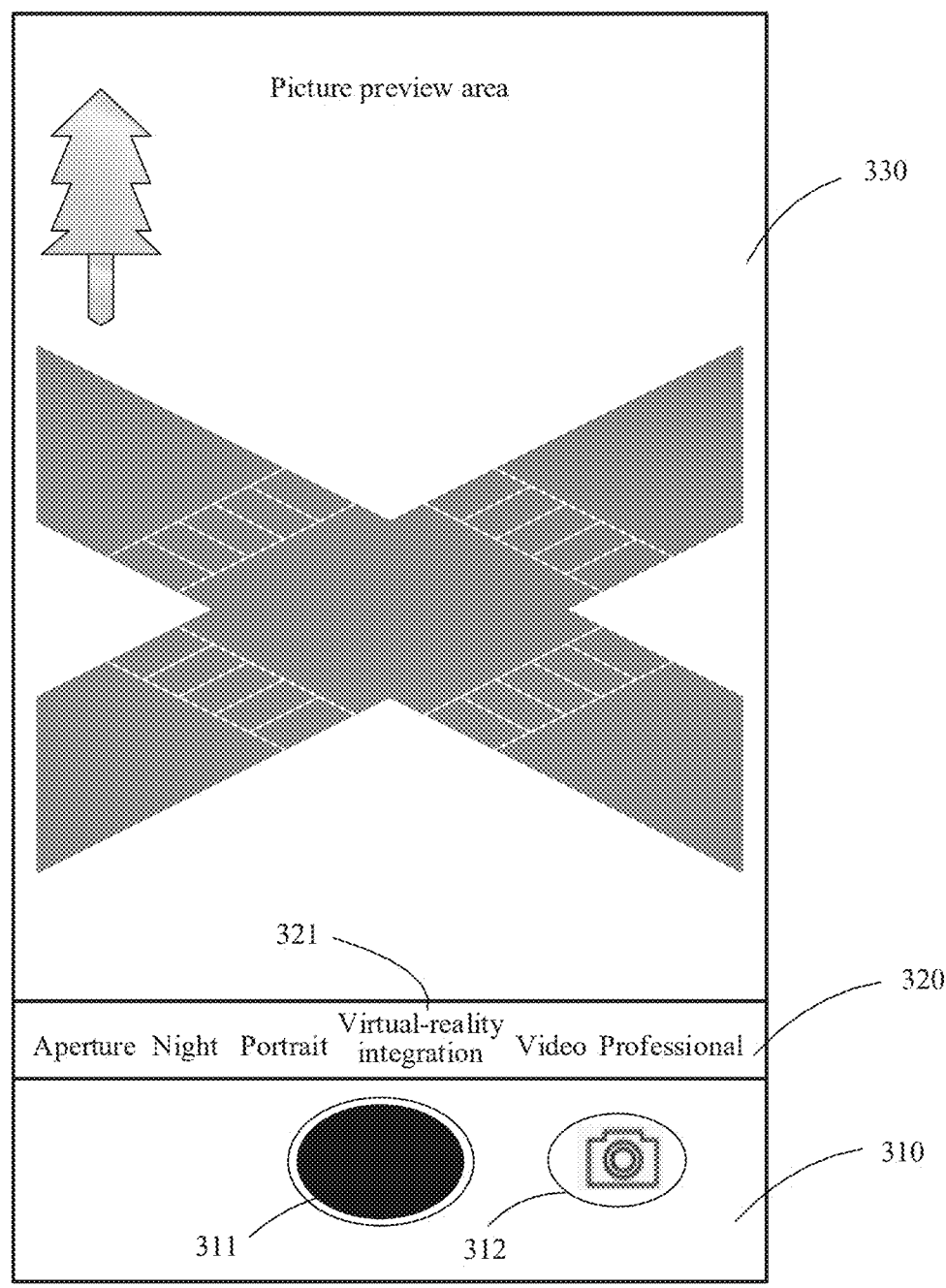
FIG. 3A is a schematic diagram of a shooting mode selection interface according to an embodiment of this application.

Specifically, after the user starts the camera, the camera may capture the real environment picture, and display the real environment picture on the display 120 of the mobile terminal 100. For example, the display interface of the mobile terminal 100 may be used to display the real environment picture shown in FIG. 3A. Refer to FIG. 3A. A display interface 300 of the mobile terminal 100 includes a shooting operation area 310, a shooting mode selection area 320, and a picture preview area 330. The shooting mode selection area 320 may include a plurality of shooting mode options 321, for example, Aperture, Night, Portrait, Virtual-reality integration, Video, and Professional. The shooting operation area 310 includes a shooting button 311 and a camera switching button 312. The picture preview area 330 is used to display the real environment picture captured by the camera, for example, a street picture shown in FIG. 3A. It should be noted that the mobile terminal 100 with a single camera does not have a camera switching function, and therefore does not have the camera switching button 312. When the mobile terminal 100 includes a plurality of cameras, and the cameras are located on two sides of the mobile terminal 100, the mobile terminal 100 has the camera switching function, and may include the camera switching button 312.

If the mobile terminal 100 includes the plurality of cameras, and the cameras are located on the two sides of the mobile terminal 100, a current camera may be selected by tapping the camera switching button 312 in the shooting operation area 310, for example, a front-facing camera or a rear-facing camera may be selected. If the mobile terminal 100 includes only one camera, camera switching is not needed. If the current camera supports a virtual-reality integration shooting function, a multi-virtual-reality integration option appears in the option 321 in the shooting mode selection area 320. If the current camera does not support such a function, a multi-virtual-reality integration option does not appear.

Step 103: Display a candidate virtual object in response to a detected operation of selecting a virtual-reality integration shooting mode by the user.

Specifically, on the display interface 300 shown in FIG. 3A, the user may select a shooting mode option 321 to determine a current shooting mode. For example, the user may tap a virtual-reality integration option to enter the virtual-reality integration shooting mode. In this case, the mobile terminal 100 displays the candidate virtual object.

Figure 3B:
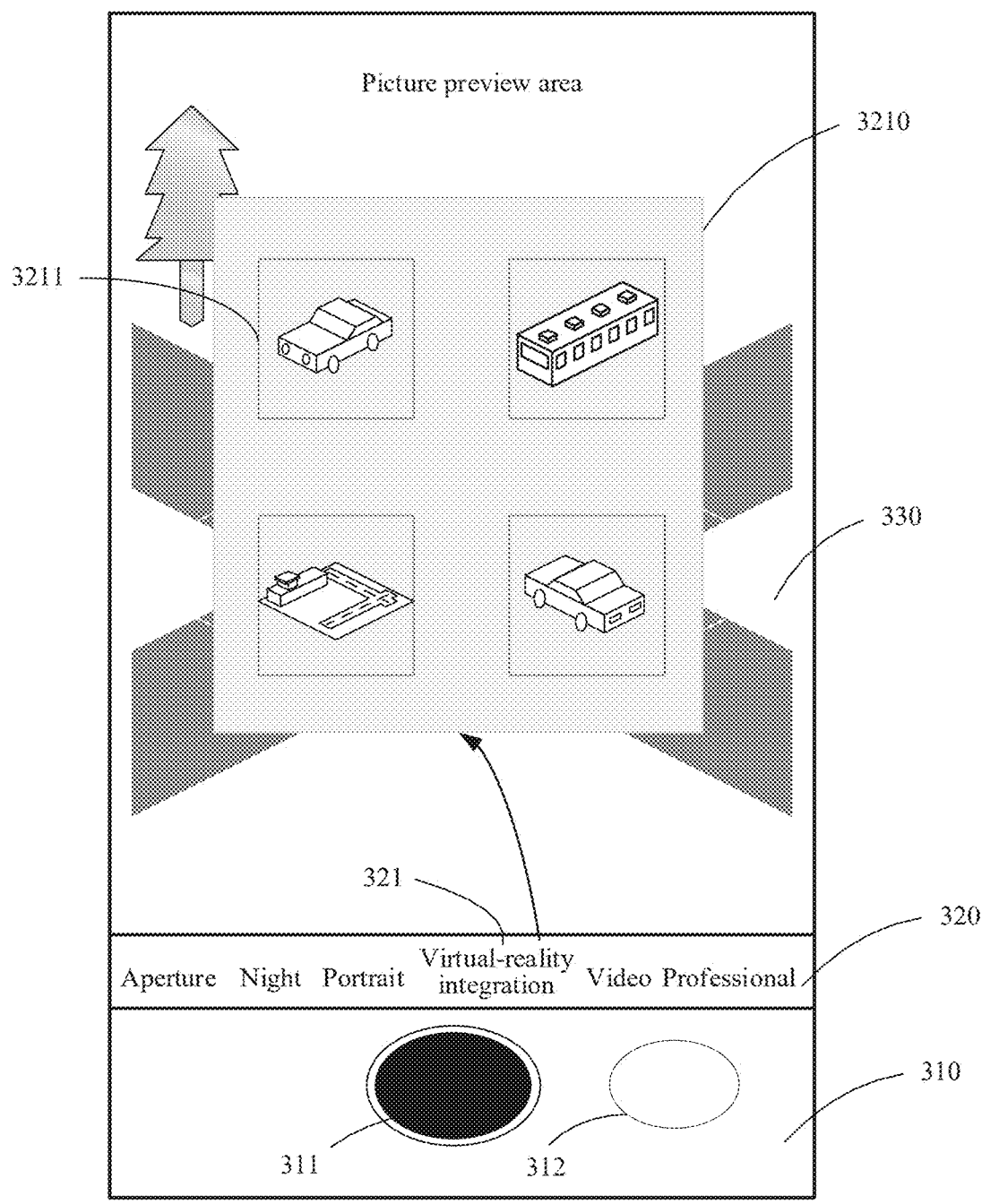
FIG. 3B is a schematic diagram of a candidate virtual object display interface according to an embodiment of this application.

FIG. 3A is used as an example for description. After the user taps the virtual-reality integration option 321, a virtual object candidate area 3210 pops up in the display interface 300, and then a display interface 400 shown in FIG. 3B is obtained. The virtual object may be a 3D model, for example, a 3D character, a 3D animal, or a 3D object. This is not limited in this embodiment of this application. The virtual object candidate area 3210 includes at least one virtual object option 3211 for the user to select the virtual object.

The virtual object option 3211 may be a preview image corresponding to the virtual object. It may be understood that the virtual object option 3211 may alternatively be an icon or another display form. This is not limited in this embodiment of this application. For example, after the user selects the virtual object option 3211, the mobile terminal 100 may load a virtual object corresponding to the selected preview image, so that the virtual object may be displayed on the display interface 400.

The virtual object may be pre-stored in the memory 150 of the mobile terminal 100. After selecting the virtual object, the user may directly invoke the virtual object from the memory 150 and load the virtual object. The virtual object may alternatively be stored in another device, for example, stored in a server. After selecting the virtual object, the user may download the virtual object selected by the user from the another device, and load the downloaded virtual object.

Further, when the virtual object option 3211 is displayed in the virtual object candidate area 3210, the preset virtual object option 3211 may be displayed. For example, only one preset virtual object option 3211 is pushed each time virtual-reality integration shooting is performed. In other words, only one preset virtual object option 3211 in the virtual object candidate area 3210 is available for selection by the user. It may be understood that the plurality of virtual object options 3211 may be preset. For example, the plurality of preset virtual object options 3211 are pushed in the virtual object candidate area 3210. In this case, the plurality of virtual object options 3211 are available for selection by the user in the virtual object candidate area 3210. One or more virtual objects corresponding to the preset virtual object option 3211 may be pre-stored in the mobile terminal 100, or may be pre-stored in another device.

Optionally, when the virtual object option 3211 is displayed in the virtual object candidate area 3210, the virtual object option 3211 may be further pushed based on a current real environment picture captured by the camera. For example, the virtual object option 3211 may be classified in advance. For example, the virtual object option 3211 may be a character, an animal, a home appliance, or a building. After the camera captures the real environment picture, the mobile terminal 100 may analyze the current real environment picture, to determine a category to which the current real environment picture is related, for example, the category may be the character, the animal, the household appliance, the building, or the like. After determining the category of the current real environment picture, the mobile terminal 100 may perform matching between the category of the current real environment picture and a category of the virtual object option 3211, and push the matched virtual object option 3211. For example, the virtual object option 3211 related to the category of the current real environment picture is displayed in the virtual object candidate area 3210 and selected by the user. In this way, efficiency of selecting the virtual object by the user from the candidate virtual objects can be improved. This further improves user experience.

Step 104: Determine a first virtual object in response to a detected operation of selecting a virtual object by the user.

Specifically, the user may perform an operation on the virtual object option 3211 in the virtual object candidate area 3210, to select the virtual object. For example, the user may tap or drag the virtual object option 3211 in the virtual object candidate area 3210, to select the virtual object. It may be understood that the user may alternatively select the virtual object by performing another operation. This is not limited in this embodiment of this application. After receiving the operation of selecting the virtual object by the user, the mobile terminal 100 loads the virtual object corresponding to the virtual object option 3211 selected by the user. If the virtual object is already stored in the mobile terminal 100, the mobile terminal 100 may directly invoke and load the virtual object, so that the virtual object is displayed in the picture preview area 330. If the virtual object is not stored in the mobile terminal 100, the mobile terminal 100 may download the virtual object based on a link address of the virtual object option 3211. For example, the link address may be a server address. In this case, the mobile terminal may initiate a request to the server to obtain the virtual object. After obtaining the virtual object by downloading, the mobile terminal 100 may load the virtual object, so that the virtual object is displayed in the picture preview area 330. The virtual object may include an initial state. The initial state may include default size information and default angle information of the virtual object. The size information may be used to identify a size of the virtual object. For example, the size information of the virtual object may be identified by using a length, a width, and a height. The angle information may be used to identify a rotation angle of the virtual object. For example, the angle information of the virtual object may be identified by using a lateral rotation angle and a longitudinal rotation angle. It may be understood that, after loading the virtual object, the mobile terminal 100 may render the virtual object based on the default size information and the default angle information, and display the virtual object on the preview screen.

FIG. 3B is used as an example for description. Refer to FIG. 3B. There are four virtual object options 3211 in the virtual object candidate area 3210, which are respectively a small vehicle 1 in an upper left corner, a large vehicle in an upper right corner, a building in a lower left corner, and a small vehicle 2 in a lower right corner. The user may select the small vehicle 1 by performing an operation on a preview image of the small vehicle 1 in the upper left corner. For example, the user may tap the preview image of the small vehicle 1 to select the small vehicle 1. It may be understood that the user may also select the virtual object by performing another operation. This is not limited in this embodiment of this application.

Step 105: Obtain positioning information of the first virtual object, and display the first virtual object on a preview screen based on the positioning information.

Specifically, the positioning information may include the size information and the angle information of the virtual object in step 104. In addition, the positioning information may include location information. The location information is used to identify a coordinate location of the virtual object in the picture preview area 330. For example, a center point of the virtual object may be used as the coordinate location. Based on this, the mobile terminal 100 may record the coordinate location of the center point of the virtual object in the picture preview area 330. It may be understood that a picture displayed in the picture preview area 330 is the real environment picture. Therefore, after imaging, for example, after an image corresponding to the real environment picture is generated, coordinates of the virtual object in the picture preview area 330 may be converted into coordinates of the virtual object in the displayed environment picture image.

The positioning information may be default positioning information of the virtual object. For example, the default size information and the default angle information of the virtual object are displayed in a default location of the picture preview area 330. Alternatively, the virtual object may be displayed in any coordinate location of the picture preview area 330. For example, a coordinate location is randomly selected to display the virtual object. This is not limited in this embodiment of this application.

FIG. 3B is used as an example. After receiving the operation of selecting the first virtual object (for example, the small vehicle 1) by the user, the mobile terminal 100 obtains the virtual object corresponding to the virtual object option 3211 selected by the user, loads the first virtual object, and displays the first virtual object in the picture preview area 330 based on the default positioning information of the first virtual object, to obtain a display interface 500 shown in FIG. 3C. If the first virtual object is already stored in the mobile terminal 100, the mobile terminal 100 may directly invoke and load the first virtual object, so that the first virtual object is displayed in the picture preview area 330. If the first virtual object is not stored in the mobile terminal 100, the mobile terminal 100 may download the first virtual object based on the link address of the virtual object option 3211. For example, the link address may be the server address. In this case, the mobile terminal may initiate the request to the server, to obtain the first virtual object. After obtaining the first virtual object by downloading, the mobile terminal 100 may load the first virtual object, so that the first virtual object is displayed in the picture preview area 330.

Optionally, the user may further change the positioning information of the virtual object in the picture preview area 330 by performing an operation on the virtual object. For example, the user may drag the virtual object to change the location information of the virtual object in the picture preview area 330. The user may rotate the virtual object to change the angle information of the virtual object in the picture preview area 330. The user may scale the virtual object to change the size information of the virtual object in the picture preview area 330. In response to a user operation of changing the positioning information of the virtual object, the mobile terminal 100 may record updated positioning information of the virtual object.

Step 106: Obtain current ambient light information based on the real environment picture captured by the camera.

Specifically, after the virtual object is displayed in the picture preview area 330, the current ambient light information is obtained based on the real environment picture captured by the camera. The ambient light information may include an illumination angle and illumination intensity. The illumination angle may be used to represent a current illumination direction of a light source, and the illumination intensity may be used to represent intensity of illumination and an amount of illumination to which a surface area of an object is subject.

It should be noted that the ambient light information may be obtained according to an image analysis method. For example, after the camera captures the real environment picture, the processor 130 of the mobile terminal 100 may invoke the image analysis method, to analyze a display environment picture captured by the camera, and further obtain the ambient light information. For example, the most bright spot in the real environment picture may be detected, and then an illumination direction of the light source, namely, the illumination angle, may be estimated based on the most bright spot. The illumination intensity may be estimated based on a luminance difference and a distance between the most bright spot and a second bright spot. The image analysis method belongs to the conventional technology. Details are not described herein again.

It may be understood that the camera moves with movement of the mobile terminal 100. Therefore, a location of the camera relative to the light source changes, causing the ambient light information to change with movement of the mobile terminal 100. During movement of the mobile terminal 100, the camera may obtain the ambient light information in real time. For example, when the user moves the mobile terminal 100, the camera also moves accordingly, and the real environment picture displayed in the picture preview area 330 changes. Correspondingly, the ambient light information also changes.

Step 107: Render the first virtual object in a current picture preview area based on the ambient light information, to obtain a second virtual object.

Specifically, after the first virtual object is displayed in the picture preview area 330 of the mobile terminal 100, the mobile terminal 100 may render the first virtual object based on the current ambient light information to obtain the second virtual object. Rendering may include updating brightness and/or a shadow of the first virtual object. In other words, the second virtual object is obtained by updating the brightness and/or the shadow of the first virtual object. The brightness may be used to represent how dark or light various parts of the virtual object are. Corresponding brightness is displayed for various parts of the virtual object based on an illumination angle and illumination intensity of the light source. For example, when the light source shines down from the top of the virtual object, the top of the virtual object is bright, and the bottom is dark. The shadow is used to represent a shadow part corresponding to the virtual object. The virtual object generates a corresponding shadow area and shadow brightness based on the illumination angle and the illumination intensity of the light source. For example, when the light source shines directly in front of the virtual object, a shadow is generated behind the virtual object. It may be understood that an original virtual object includes initial brightness, and the initial brightness corresponds to an initial light source.

Therefore, after obtaining the current ambient light information, the mobile terminal 100 may update brightness of the virtual object based on the current ambient light information. However, the original virtual object does not include a shadow. Therefore, after obtaining the current ambient light information, the mobile terminal 100 may add a shadow to the virtual object based on the current ambient light information. It should be noted that the shadow is generated based on the current ambient light information. However, for some light sources, no shadow is generated. For example, when the light source projects vertically from the top of the virtual object, or in some cloudy days, ambient light is insufficient to generate the shadow.

It should be noted that rendering the brightness and/or the shadow of the virtual object may be implemented by using a preset rendering model (for example, an existing 3D engine). For example, the mobile terminal 100 may invoke a preset 3D engine to enter the ambient light information and a to-be-rendered first virtual object into the preset 3D engine, so that rendering of the first virtual object can be completed to obtain the second virtual object. In this way, the second virtual object can be consistent with an object in the real environment picture. For example, brightness of the second virtual object is consistent with that of the object in the real environment picture, and/or a shadow of the second virtual object is consistent with that of the object in the real environment picture. The 3D engine belongs to the conventional technology. Details are not described herein again.

Figure 3C:
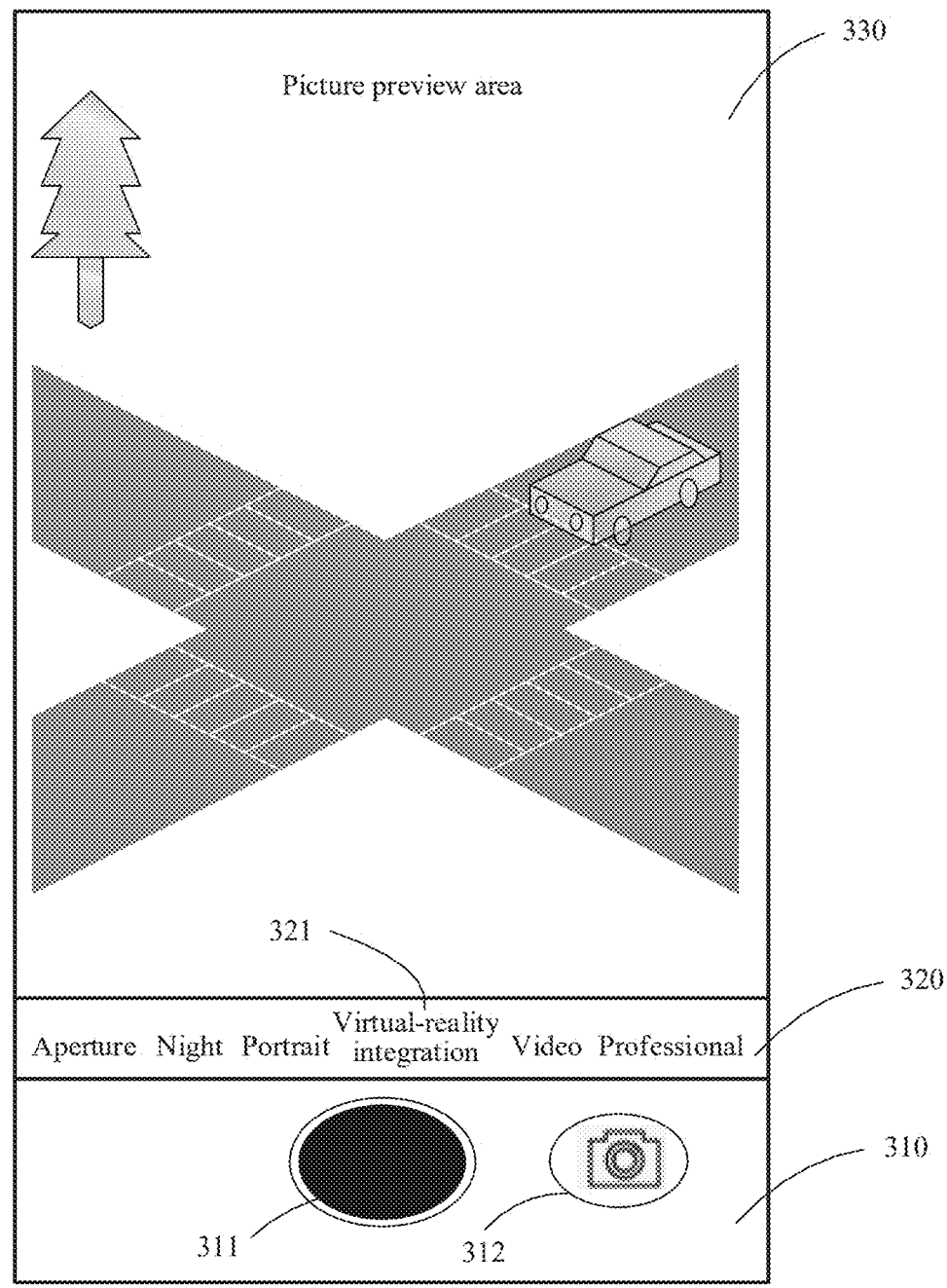
FIG. 3C is a schematic diagram of a virtual object selection interface according to an embodiment of this application.
Figure 3D:
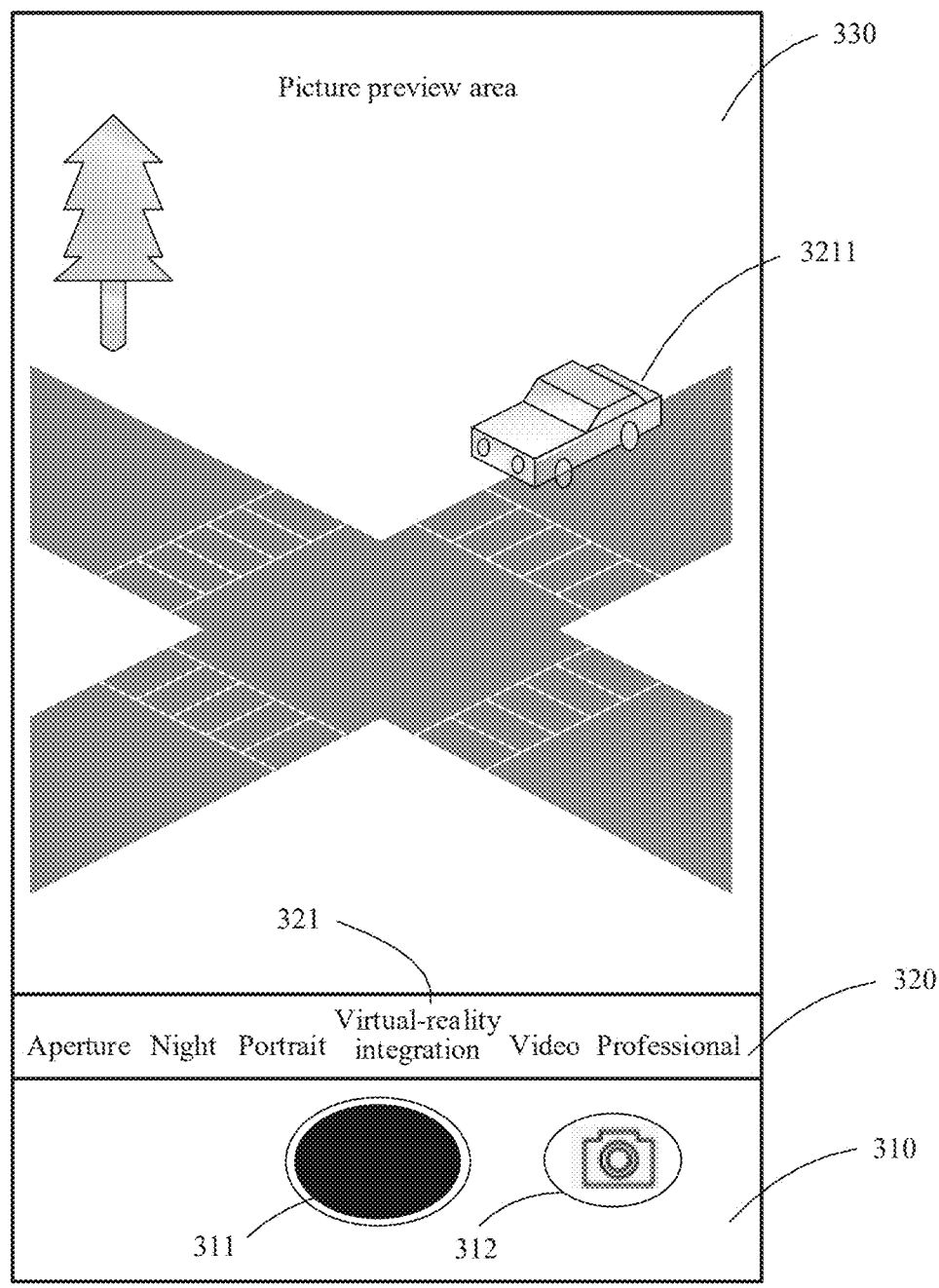
FIG. 3D is a schematic diagram of a virtual object rendering effect according to an embodiment of this application.

FIG. 3C is used as an example for description. Refer to FIG. 3C. An illumination direction of the light source is on the upper left. In a real environment, a shadow of a tree in an upper left corner is on a right side of the tree, but the virtual object (for example, the small vehicle 1) has no shadow. After obtaining the ambient light information, the processor 130 of the mobile terminal 100 invokes the preset 3D engine to render the virtual object, to obtain a display interface 600 shown in FIG. 3D. Refer to FIG. 3D, the brightness of the virtual object (for example, the small vehicle 1) changes, and is consistent with that of the tree. In addition, a shadow is added to the virtual object, to consistent with the shadow of the tree.

Further, in the picture preview area 330, the user may transform the virtual object. Performing transformation on the virtual object may include performing location transformation, size transformation, and/or angle transformation on the virtual object. For example, the user may drag the virtual object to change the coordinate location of the virtual object in the picture preview area 330, the user may scale the virtual object to change a size of the virtual object in the picture preview area 330, and/or the user may rotate the virtual object to change an angle of the virtual object in the picture preview area 330. Rotation may include rotation in a horizontal direction and rotation in a vertical direction, to change a horizontal angle and a vertical angle of the virtual object in the picture preview area 330.

It may be understood that, after the virtual object is transformed, the mobile terminal 100 may re-render the transformed virtual object. For example, after the angle of the virtual object is transformed, an angle of each part of the virtual object also changes. Therefore, re-rendering needs to be performed to update the brightness and/or the shadow of the virtual object.

Step 108: Generate a third image in response to a detected shooting operation of the user. The third image includes a first image corresponding to the real environment picture and a second image corresponding to the second virtual object.

Specifically, the user may shoot the real environment picture by using a shooting operation, and synthesize the real environment picture and the image of the virtual object into one image. For example, the user may press the shooting button 311 in the shooting operation area 310, to implement a shooting function, so that the third image can be generated in the mobile terminal 100. The third image is obtained by synthesizing the first image and the second image. The first image may be the current real environment picture, and the second image may be an image corresponding to the second virtual object. After receiving the shooting operation of the user, the mobile terminal 100 generates the first image and the second image. Then, the mobile terminal 100 obtains a coordinate location of the second image in the first image. It may be understood that a step of obtaining, by the mobile terminal 100, the coordinate location of the second image in the first image may be performed simultaneously with a step of generating the first image and the second image, or may be performed before the step of generating the first image and the second image. This is not specially limited in this embodiment of this application. Based on the coordinate location, the mobile terminal 100 synthesizes the first image and the second image. For example, the mobile terminal 100 may superimpose the second image on the first image, to obtain the synthesized third image. The second image corresponding to the second virtual object may be obtained in a flashing manner, or may be obtained in another image capturing manner. This is not limited in this embodiment of this application.

It may be understood that images may be synthesized in a layer combination manner. For example, the first image may be used as a first layer, the second image may be used as a second layer, and the second layer may be superimposed on the first layer, to obtain the synthesized third image. Alternatively, images may be synthesized in another manner. This is not specially limited in this embodiment of this application.

Figure 4:
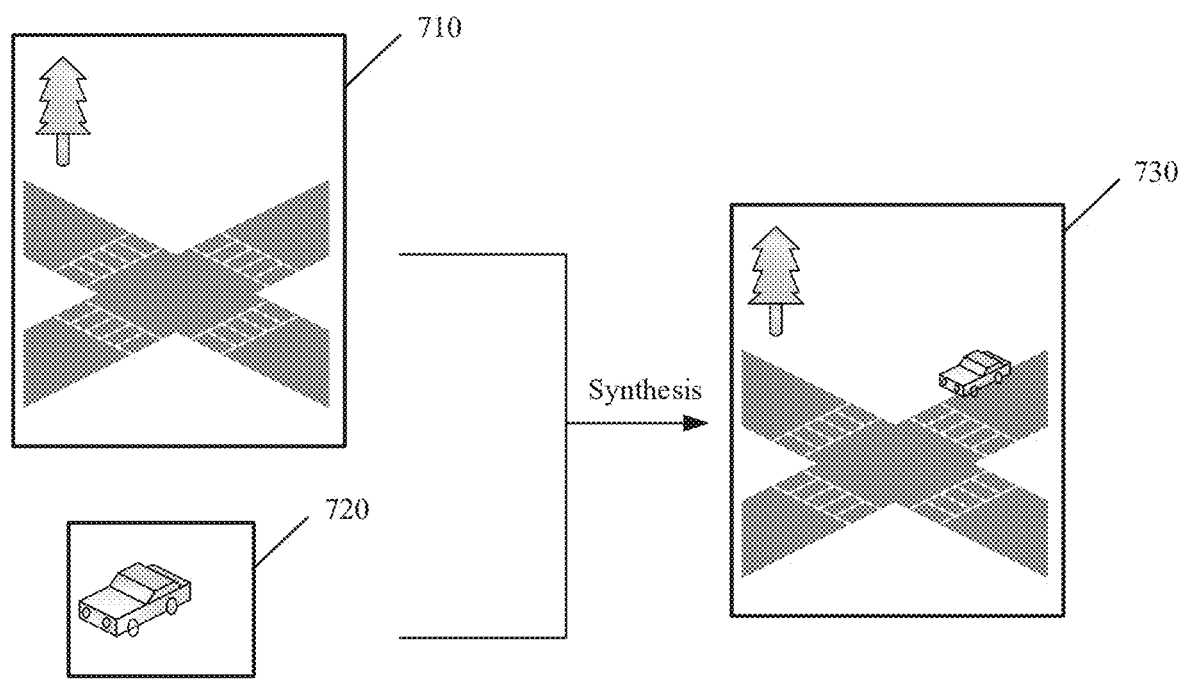
FIG. 4 is a schematic diagram of image synthesis according to an embodiment of this application.

Descriptions are provided with reference to FIG. 4. As shown in the figure, an image 710 is the first image corresponding to the real environment picture captured by the camera, and an image 720 is a planar image of the second virtual object obtained by brightness and/or shadow rendering. An image 730 may be obtained by synthesizing the image 710 and the image 720, and the image 730 is the finally synthesized third image. Brightness and/or a shade of the real environment picture in the image 710 are consistent with those of the second virtual object in the image 720.

Further, after generating the third image, the mobile terminal 100 may further display the third image, and may store the third image in an album of the mobile terminal 100, so that the user can browse the third image. It may be understood that the third image may alternatively be stored in a cloud or a server. This is not limited in this embodiment of this application.

In this embodiment, the mobile terminal obtains the current ambient light information in real time during shooting of the real environment picture, and renders the brightness and/or shadow of the virtual object in real time based on the ambient light information. In this way, it can be ensured that the brightness and/or of the rendered virtual object are consistent with those of the real environment, and image distortion caused by inconsistency between the two can be avoided. This improves viewing experience of the user.

Figure 5:
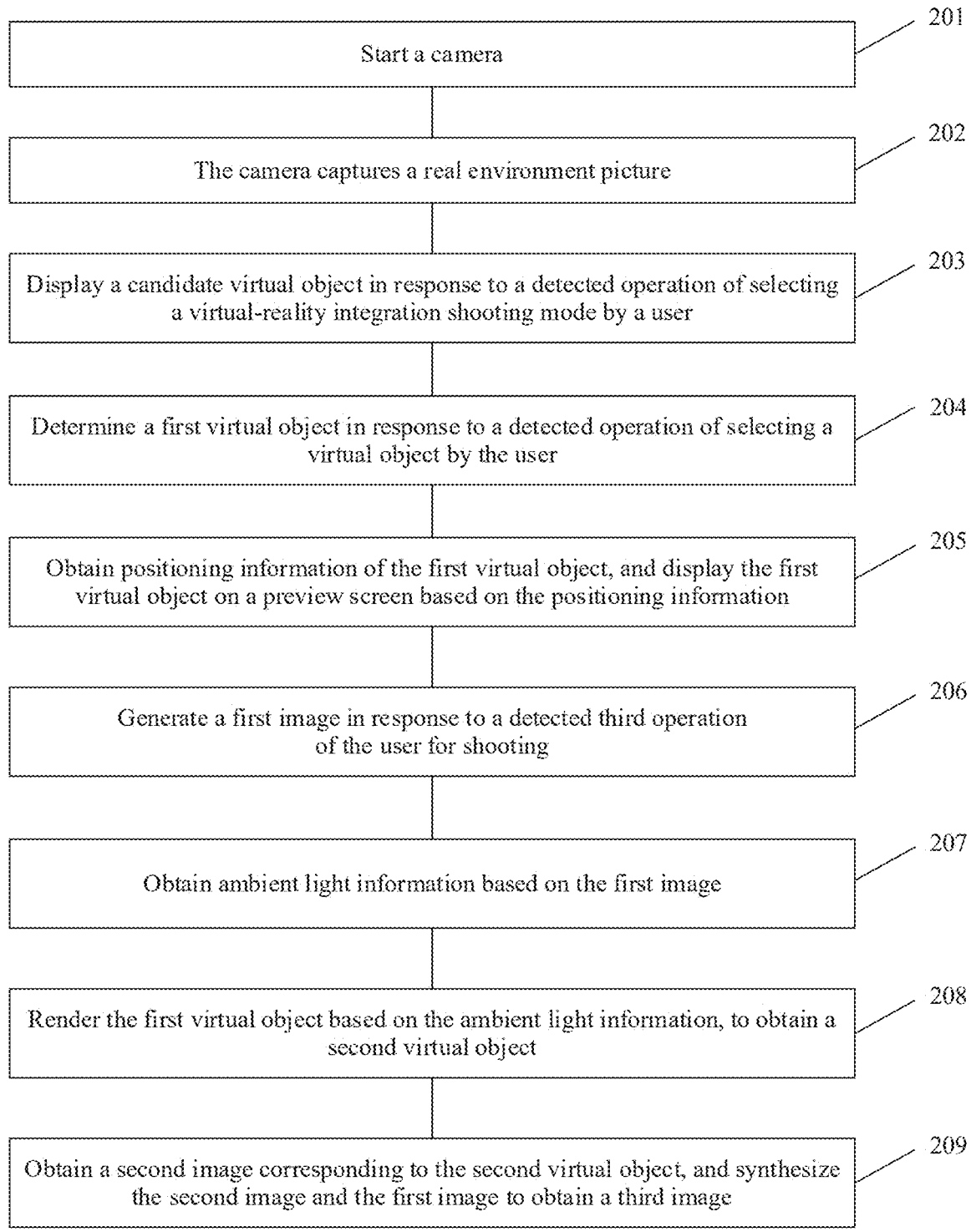
FIG. 5 is a flowchart of another image processing method according to an embodiment of this application.

FIG. 5 is a flowchart of another image processing method according to an embodiment of this application. The method may be applied to the mobile terminal 100, and includes the following steps.

Step 201: Start a camera.

Specifically, step 201 is the same as step 101. Details are not described herein again.

Step 202: The camera captures a real environment picture.

Specifically, step 202 is the same as step 102. Details are not described herein again.

Step 203: Display a candidate virtual object in response to a detected operation of selecting a virtual-reality integration shooting mode by the user.

Specifically, step 203 is the same as step 103. Details are not described herein again.

Step 204: Determine a first virtual object in response to a detected operation of selecting the virtual object by the user.

Specifically, step 204 is the same as step 104. Details are not described herein again.

Step 205: Obtain positioning information of the first virtual object, and display the first virtual object on a preview screen based on the positioning information.

Specifically, step 205 is the same as step 105. Details are not described herein again.

Step 206: Generate a first image in response to a detected shooting operation of the user.

Specifically, the user may shoot the real environment picture by using a shooting operation, to obtain the first image corresponding to the real environment picture. For example, the user may press the shooting button 311 in the shooting operation area 310. After receiving the shooting operation of the user, the mobile terminal 100 may generate the first image. The first image may be a real scene picture captured by the camera.

Step 207: Obtain ambient light information based on the first image.

Specifically, the first image is analyzed to obtain the ambient light information corresponding to the first image. The first image may be analyzed by using the image analysis method in step 106, to obtain corresponding ambient light information, for example, an illumination angle and illumination intensity.

Step 208: Render the first virtual object based on the ambient light information, to obtain a second virtual object.

Specifically, the first virtual object is rendered based on the ambient light information. For example, the first virtual object may be rendered in the manner of invoking the 3D engine in step 107 to obtain the second virtual object. The second virtual object is a virtual object of which brightness and/or shade are adjusted. Therefore, the brightness and/or the shadow of the second virtual object can be kept consistent with a real environment.

Step 209: Obtain a second image corresponding to the second virtual object, and synthesize the second image and the first image to obtain a third image.

Specifically, for a specific manner of obtaining the second image and a coordinate location of the second image in the first image, refer to step 108. Details are not described herein again. The second image and the first image are synthesized based on the coordinate location to obtain the third image. For an image synthesis manner, refer to step 108. Details are not described herein again.

In this embodiment, after performing the shooting operation to generate an image corresponding to the real environment picture, the mobile terminal obtains ambient light information corresponding to the real environment picture, and performs, based on the ambient light information, brightness and/or shadow rendering on a virtual object for one time, to ensure that the brightness and/or the shade of the virtual object are consistent with those of the real environment, reduce resource consumption caused by real-time rendering, and avoid excessive load to the mobile terminal. This improves processing efficiency of the mobile terminal.

Figure 6:
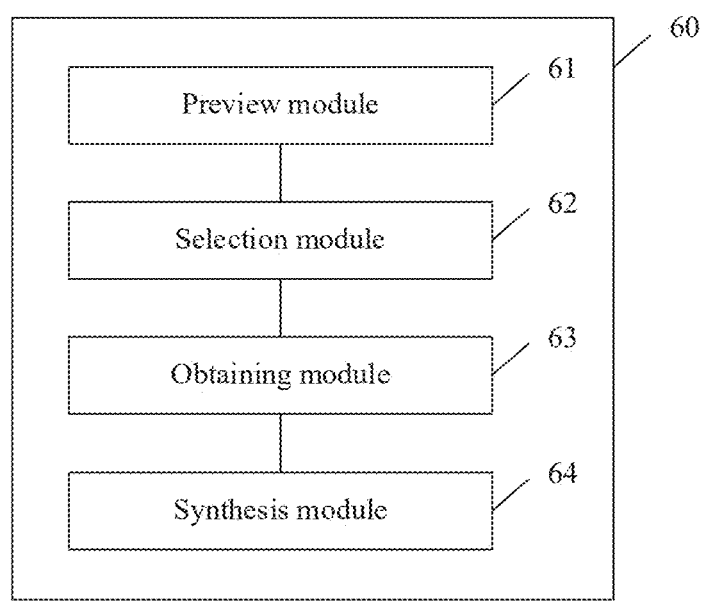
FIG. 6 is a schematic diagram of a structure of an image processing apparatus according to an embodiment of this application.

FIG. 6 is a schematic diagram of a structure of an image processing apparatus according to an embodiment of this application. As shown in FIG. 6, the image processing apparatus 60 may include a preview module 61, a selection module 62, an obtaining module 63, and a synthesis module 64.

The preview module 61 is configured to display a preview screen in response to a detected first operation. The preview screen includes a real environment picture.

The selection module 62 is configured to determine a first virtual object in response to a detected second operation.

The obtaining module 63 is configured to obtain positioning information of the first virtual object, and display the first virtual object on the preview screen based on the positioning information.

The synthesis module 64 is configured to synthesize a first image and a second image based on the positioning information to obtain a third image. The first image includes the real environment picture, the second image includes a second virtual object corresponding to the positioning information, the second virtual object is generated by rendering the first virtual object based on ambient light information, and the ambient light information corresponds to the real environment picture.

In a possible implementation, the synthesis module 64 includes a first generation unit 641, an identification unit 642, a rendering unit 643, a second generation unit 644, and a synthesis unit 645.

The first generation unit, 641 is configured to generate the first image in response to a detected third operation.

The identification unit 642 is configured to obtain, based on the first image, ambient light information corresponding to the first image.

The rendering unit 643 is configured to render the first virtual object based on the ambient light information to obtain the second virtual object.

The second generation unit 644 is configured to generate the second image based on the second virtual object.

The synthesis unit 645 is configured to synthesize the first image and the second image based on the positioning information to obtain the third image.

In a possible implementation, the synthesis module 64 includes an obtaining unit 646, a rendering unit 647, a generation unit 648, and a synthesis unit 649.

The obtaining unit 646 is configured to obtain ambient light information corresponding to the real environment picture.

The rendering unit 647 is configured to render the first virtual object based on the ambient light information to obtain the second virtual object.

The generation unit 648 is configured to generate the first image and the second image in response to a detected third operation.

The synthesis unit 649 is configured to synthesize the first image and the second image based on the positioning information to obtain the third image.

In a possible implementation, the obtaining module 63 is further configured to determine the positioning information of the first virtual object on the preview screen in response to a detected fourth operation.

In a possible implementation, the positioning information includes default positioning information of the first virtual object.

In a possible implementation, the selection module 62 includes a display unit 621 and a selection unit 622.

The display unit 621 is configured to display at least one candidate virtual object in response to the detected second operation.

The selection unit 622 is configured to determine the first virtual object in the candidate virtual object in response to a detected fifth operation.

In a possible implementation, the display unit 621 is further configured to: identify a type of a real environment on the preview screen in response to the detected second operation, to obtain an environment type, and recommend displaying the candidate virtual object based on the environment type.

In a possible implementation, the synthesis module 64 is further configured to enter the first virtual object and the ambient light information into a preset rendering model, so that the preset rendering model renders brightness and/or a shadow of the first virtual object to obtain the second virtual object. The second virtual object includes the brightness and/or the shadow.

The image processing apparatus provided in the embodiment shown in FIG. 6 may be configured to perform the technical solutions of the method embodiments shown in FIG. 2 to FIG. 5 in this application. For an implementation principle and a technical effect of the image processing apparatus, refer to related descriptions in the method embodiments.

It should be understood that division into the foregoing modules of the image processing apparatus shown in FIG. 6 is merely logical function division. In actual implementation, all or some of the modules may be integrated into one physical entity, or may be physically separated. In addition, all of the modules may be implemented in a form of software invoked by using a processing element or may be implemented in a form of hardware. Alternatively, some modules may be implemented in a form of software invoked by using the processing element, and some modules are implemented in a form of hardware. For example, a detection module may be a separately disposed processing element, or may be integrated into a chip of an electronic device for implementation. An implementation of another module is similar to the implementation of the detection module. In addition, all or some of these modules may be integrated, or may be implemented independently. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, for example, one or more application-specific integrated circuits (Application-Specific Integrated Circuit, briefly referred to as an ASIC below), one or more digital signal processors (Digital Signal Processor, briefly referred to as a DSP below), or one or more field programmable gate arrays (Field Programmable Gate Array, briefly referred to as an FPGA below). For another example, the modules may be integrated together, and implemented in a form of a system-on-a-chip (System-On-a-Chip, briefly referred to as an SOC below).

It may be understood that the interface connection relationship between modules shown in this embodiment of the present invention is merely an example for description, and does not constitute a structural limitation on the mobile terminal 100. In some other embodiments of this application, the mobile terminal 100 may alternatively use an interface connection manner different from that in the foregoing embodiment, or a combination of a plurality of interface connection manners.

It may be understood that, to implement the foregoing functions, the foregoing mobile terminal includes corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present invention.

In the embodiments of this application, functional modules of the mobile terminal and the like may be obtained through division based on the foregoing method embodiments. For example, functional modules may be obtained through division in one-to-one correspondence with the functions, or two or more functions may be integrated into one processing module. The integrated module may be implemented in a form of hardware, or may be implemented in a form of a software functional module. It should be noted that in the embodiments of the present invention, module division is an example, and is merely a logical function division. During actual implementation, another division manner may be used.

The foregoing descriptions about implementations allow a person skilled in the art to understand that, for the purpose of convenient and brief description, division into the foregoing functional modules is used as an example for illustration. In actual application, the foregoing functions may be allocated to different functional modules and implemented according to a requirement, that is, an inner structure of an apparatus is divided into different functional modules to implement all or some of the functions described above. For a detailed working process of the foregoing system, apparatus, and units, refer to a corresponding process in the foregoing method embodiments. Details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions to enable a computer device (which may be a personal computer, a server, a network device, or the like) or the processor 130 to perform all or some of the steps of the method described in embodiments of this application. The foregoing storage medium includes any medium that can store program code, for example, a flash memory, a removable hard disk drive, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method implemented by a mobile terminal, wherein the image processing method comprises:
    displaying, in response to a detected first operation, a preview screen, wherein the preview screen comprises a real environment picture;
    obtaining positioning information of a first virtual object;
    displaying, based on the positioning information, the first virtual object on the preview screen;
    obtaining, from the real environment picture, ambient light information comprising an illumination angle and an illumination intensity;
    generating, by rendering the first virtual object based on the illumination angle and the illumination intensity, a second virtual object corresponding to the positioning information, wherein at least one first part of the second virtual object is rendered with a different brightness than at least one second part of the second virtual object based on the illumination angle and the illumination intensity; and
    synthesizing, based on the positioning information, a first image and a second image to obtain a third image,
    wherein the first image comprises the real environment picture, and
    wherein the second image comprises the second virtual object.

2. The image processing method of claim 1, further comprising:
    generating, in response to a detected second operation, the first image;
    obtaining, based on the first image, the ambient light information; and
    generating, based on the second virtual object, the second image.

3. The image processing method of claim 1, further comprising: generating, in response to a detected second operation, the first image and the second image.

4. The image processing method of claim 1, wherein obtaining the positioning information comprises obtaining, in response to a detected second operation, the positioning information.

5. The image processing method of claim 1, wherein the positioning information comprises default positioning information of the first virtual object.

6. The image processing method of claim 1, further comprising:
    displaying at least one candidate virtual object; and
    receiving a second operation to select the first virtual object from the at least one candidate virtual object.

7. The image processing method of claim 6, further comprising:
    identifying a type of a real environment on the preview screen;
    obtaining, based on the type, an environment type; and
    recommending, based on the environment type, the at least one candidate virtual object.

8. The image processing method of claim 1, wherein generating the second virtual object further comprises:
    entering the first virtual object and the ambient light information into a preset rendering model; and
    rendering, by the preset rendering model, a shadow of the first virtual object to obtain the second virtual object, wherein the second virtual object comprises the shadow.

9. A mobile terminal, comprising:
    a memory configured to store instructions; and
    one or more processors coupled to the memory and configured to execute the instructions to:
        display, in response to a detected first operation, a preview screen, wherein the preview screen comprises a real environment picture;
        obtain positioning information of a first virtual object;
        display, based on the positioning information, the first virtual object on the preview screen;
        obtain, from the real environment picture, ambient light information comprising an illumination angle and an illumination intensity;
        generate, by rendering the first virtual object based on the illumination angle and the illumination intensity, a second virtual object corresponding to the positioning information, wherein at least one first part of the second virtual object is rendered with a different brightness than at least one second part of the second virtual object based on the illumination angle and the illumination intensity; and
        synthesize, based on the positioning information, a first image and a second image to obtain a third image,
        wherein the first image comprises the real environment picture, and
        wherein the second image comprises the second virtual object.

10. The mobile terminal of claim 9, wherein the one or more processors are further configured to execute the instructions to:
    generate, in response to a detected second operation, the first image;
    obtain, based on the first image, the ambient light information; and
    generate, based on the second virtual object, the second image.

11. The mobile terminal of claim 9, wherein the one or more processors are further configured to execute the instructions to:
    obtain the ambient light information; and
    generate, in response to a detected second operation, the first image and the second image.

12. The mobile terminal of claim 9, wherein the one or more processors are further configured to execute the instructions to obtain, in response to a detected second operation, the positioning information.

13. The mobile terminal of claim 9, wherein the positioning information comprises default positioning information of the first virtual object.

14. The mobile terminal of claim 9, wherein the one or more processors are further configured to execute the instructions to:
    display at least one candidate virtual object; and
    receive a second operation to select the first virtual object from the at least one candidate virtual object.

15. The mobile terminal of claim 14, wherein the one or more processors are further configured to execute the instructions to:

identify a type of a real environment on the preview screen;

obtain, based on the type, an environment type; and recommend, based on the environment type, the at least one candidate virtual object.

16. The mobile terminal of claim 9, wherein the one or more processors are further configured to execute the instructions to:

enter the first virtual object and the ambient light information into a preset rendering model; and render, by the preset rendering model, a shadow of the first virtual object to obtain the second virtual object, wherein the second virtual object comprises the shadow.

17. A computer program product comprising instructions stored on a non-transitory computer-readable medium that, when executed by one or more processors, cause a mobile terminal to:

display, in response to a detected first operation, a preview screen, wherein the preview screen comprises a real environment picture;

obtain positioning information of a first virtual object;

display, based on the positioning information, the first virtual object on the preview screen;

obtain, from the real environment picture, ambient light information comprising an illumination angle and an illumination intensity;

generate, by rendering the first virtual object based on the illumination angle and the illumination intensity, a second virtual object corresponding to the positioning information, wherein at least one first part of the second virtual object is rendered with a different brightness than at least one second part of the second virtual object based on the illumination angle and the illumination intensity; and synthesize, based on the positioning information, a first image and a second image to obtain a third image, wherein the first image comprises the real environment picture, and wherein the second image comprises the second virtual object.

18. The computer program product of claim 17, wherein the one or more processors are further configured to execute the instructions to:

generate, in response to a detected second operation, the first image;

obtain, based on the first image, the ambient light information; and generate, based on the second virtual object, the second image.

19. The computer program product of claim 17, wherein the one or more processors are further configured to execute the instructions to:

obtain the ambient light information; and generate, in response to a detected second operation, the first image and the second image.

20. The computer program product of claim 17, wherein the one or more processors are further configured to execute the instructions to obtain, in response to a detected second operation, the positioning information.

* * * * *